Patented Jan. 25, 1927.

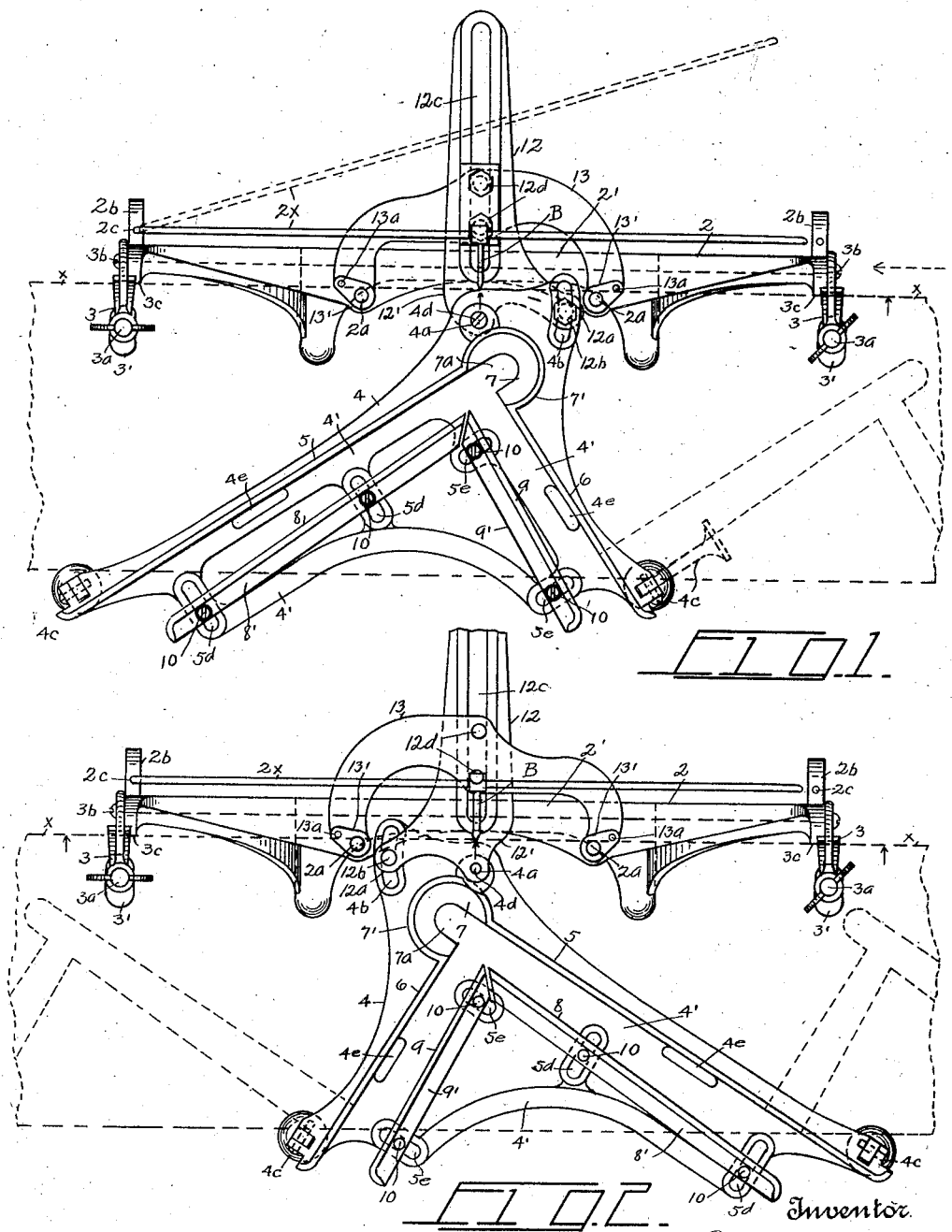

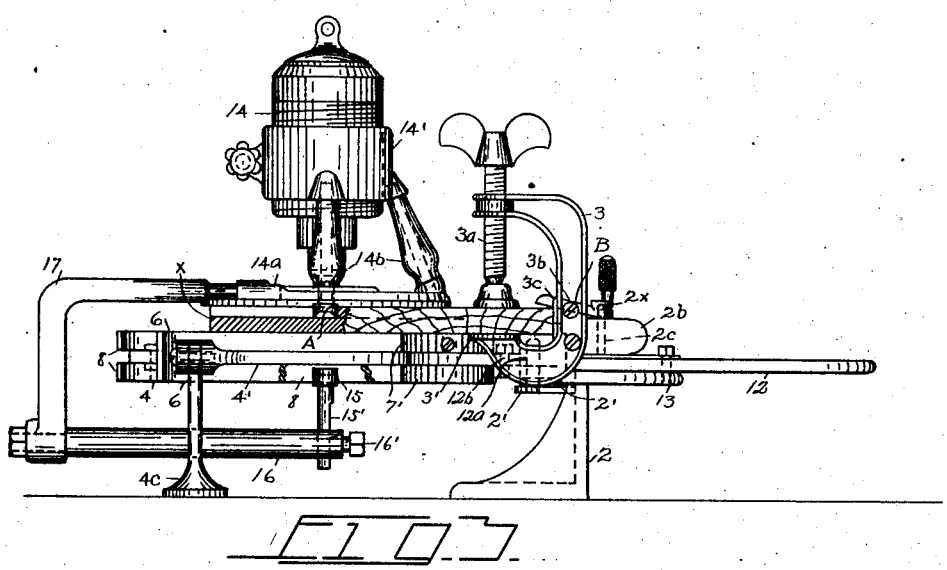
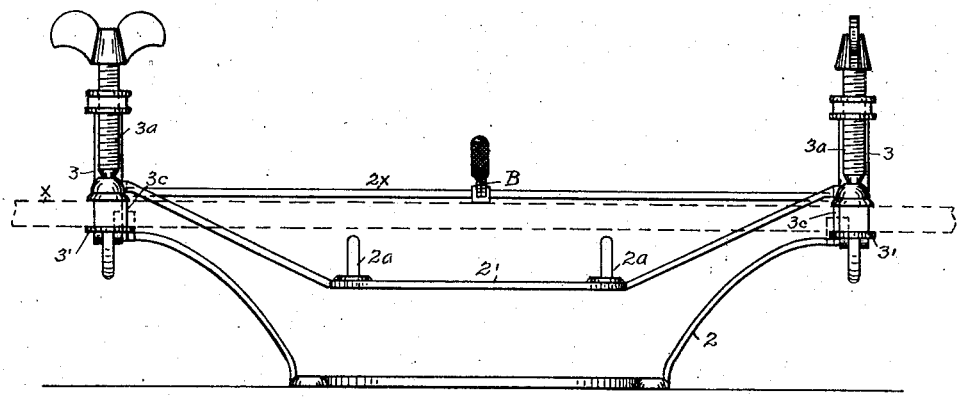
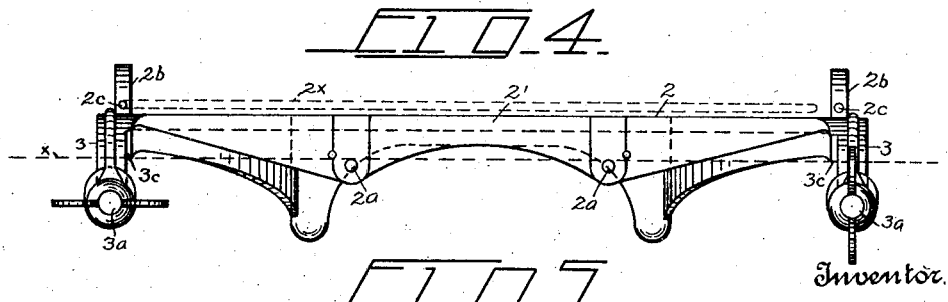

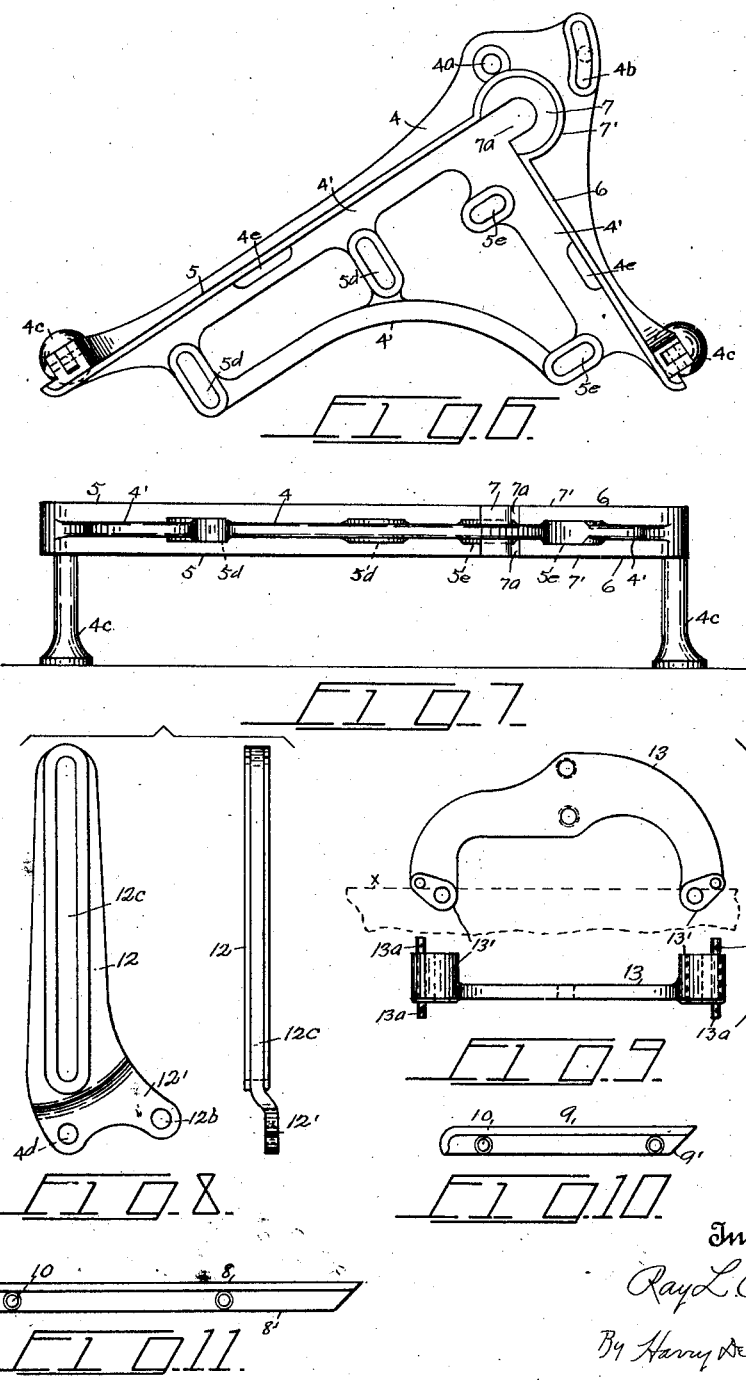

1,615,213

UNITED STATES PATENT OFFICE.

RAY L. CARTER, OF PHOENIX, NEW YORK.

TEMPLATE FOR GUIDING ROUTING MACHINES.

Application filed July 29, 1926. Serial No. 125,819.

This invention relates to a guide or pattern for routing machines, designed particularly for use by stair-builders, for cutting the riser and tread seats or grooves in the stair stringers, and has for its object to provide a portable template mechanism of simple, light and compact construction, and having means for readily and quickly adjusting the guide members and related parts for cutting seats of various dimensions. A further object is to provide a template which is adapted for cutting like seats in the opposite or right and left stringers, by simply inverting the guiding mechanism. A further object is to provide similar coinciding guide-ways in the top and bottom faces of the template, the said ways being separated by a plane web formed with the permanent guide members, the said template being supported by a shoe, upon which the template may be adjusted for varying the pitch of a stairway, the said template and said shoe being removably supported by a base, and adapted to be alternately reversed or inverted for gaging the routing of the right and left hand stringers without requiring readjustment. A further object is to provide novel means for predetermining the spacing of the several steps of a stairway and for successively indicating and accurately gaging the cutting of the seats during the routing operations. A further object is to provide a reversible template having independent right and left hand guide-ways upon which the stringers are adapted to be mounted, thereby eliminating all obstructions from and leaving the top surface of the stringers clear and free for the maneuvering of the router. A further object is to provide a motor driven router adapted to rest directly upon and to move in all directions in the plane of the top surface of the stringer, the said router being equipped with a guide arm that is positioned radially beneath the template, and moves in unison with the router, the said arm being provided with a guide-roller whose axis coincides with the axis of the router bit, the said roller being arranged to traverse the guide-ways in the underside of the template, and to engage the guiding faces of the said ways, for causing the router bit to trace and cut correspondingly shaped tread and riser seats in the top face of the stringer. And a further object is to provide a base of novel construction and arrangement having means whereby the router guide may be quickly removed, inverted and reapplied, and having means for gaging, clamping and holding the stringers during the routing operation.

I attain these objects by the means set forth in the detailed description which follows, and as illustrated by the accompanying drawing, in which—

Fig. 1 is a top plan view of the complete device; showing the template mounted for cutting the riser and tread seats of the right hand stringer of a stairway. Fig. 2 is a similar view showing the template inverted for routing the left hand stringer. Fig. 3 is an end elevation taken in the direction of the dotted arrow in Fig. 1 showing the router in the act of cutting the riser seat, parts being broken away for showing the progress of the router bit and the coinciding guide-roller. Fig. 4 is a front side elevation of the base. Fig. 5 is a top plan view of the same. Fig. 6 is a top plan view of the body of the template, the adjustable guides being removed. Fig. 7 is a front side elevation of the same. Fig. 8 is respectively a top plan and an end view of the slotted bar to which the template is pivoted. Fig. 9 is respectively a top plan and a front edge view of the reversible shoe. And Figs. 10 and 11 are respectively detached views of one pair of the adjustable riser and tread guide rails.

In the drawing, 2 represents an elongated base having its central portion 2' depressed and provided with spaced vertically disposed posts 2$^a$. Upon the ends of the base are mounted similar clamping members 3 that are formed with corresponding forwardly projecting ledges 3' for supporting one edge of a stair stringer or other work, as $x$. The clamping of the work is effected by screws 3$^a$, in the usual manner. The clamps 3 are secured to the base by bolts 3$^b$. The base 2 is also formed with rearwardly facing lugs 2$^b$ having vertical perforation 2$^c$, for pivotally supporting a rod 2$^x$ by which the routing for the several stair steps is gaged. The upright faces 3$^c$ of the clamps comprise gages or stops for properly positioning the work.

4 represents the body of the template which is substantially triangular in plan, as best seen in Fig. 6, and comprises a central plane horizontal web 4', upon the top and bottom faces of which are cast similar permanent tread and riser guide members or ribs 5—6, which are exactly at right angles to each other. The top and bottom guide members 5—6 exactly coincide, and the said members are preferably joined at their converging ends, by similar coinciding circular ribs 7', in which is removably disposed a circular block of wood, as 7, the latter being formed with the pattern of any suitable nosing, as 7ª, which usually overhangs the riser, the cut-out 7ª preferably being arranged to align with the guide-way for the tread of the stair, as shown in Figs. 1, 2 and 6. Adjacent the nosing guide 7, the web 4' is perforated as at 4ª, and a short distance from the said perforation the web is formed with an arc-shaped slot 4ᵇ (see Fig. 6). Near the free ends of the rails 5—6, the body 4 is provided with legs 4ᶜ, by which the front of the template is supported relatively to the base, the said legs being pivotally mounted, and adapted to be swung in a half-circle, for supporting the template when the latter is inverted (see Figs. 1 and 2). Within the angle lying between arms 5—6, the web 4' is formed with similar slots 5ᵈ—5ᵉ which respectively parallel the said arms.

The present template is designed particularly for producing the usual tapered or wedge-shaped seats, for the treads and risers, of box-stairs and the like, and in order to provide suitably for varying the breadth, as well as the taper of the seats, I provide similar movable guide members or rails preferably arranged in pairs, as 8—9, which are respectively mounted upon the reverse sides of the web 4', opposite the permanent guides 5 and 6 (see Figs. 1 and 2). The guiding edges of members 8—9 face the guides 5—6, and their outer sides are formed with flanges 8'—9', the latter being correspondingly perforated and one of the said flanges being threaded to receive screws 10, which play in the slots 5ᵈ—5ᵉ, by which the corresponding pairs of said members are adjustable towards and away from the opposing permanent guides 5 and 6.

The rear end of the body 4, is pivoted by a screw 4ᵈ, to the forward depressed end 12' of a bar 12, the said end being formed with a lug 12ª having a threaded perforation, to receive a bolt 12ᵇ that passes through the slot 4ᵇ of the web, and by means of which the body may be partially rotated on the screw 4ᵈ, for varying the pitch of the stairs. By locating the slot 4ᵇ relatively close to the pivot 4ᵈ, the body 4 is afforded a relatively broad range of adjustment. The bar 12 is provided with a relatively long slot 12ᶜ, and this slotted portion is adjustably mounted, and is movable longitudinally upon, a substantially semicircular shoe 13, the said bar being held in various adjusted positions, and also being prevented from lateral movements that might destroy the adjustments by two bolts, as 12ᵈ. The extremities of the shoe 13 are formed with vertical bosses or hubs 13', which are arranged to telescope the posts 2ª of the base. The top ends of said hubs are preferably disposed in the same plane as the guides 5—6—8—9 and also the ledges 3' of the clamps, and are engaged by the underside of the stringer æ (see Fig. 9). The hubs 13' are also provided with vertically arranged studs 13ª, which extend above and below the said posts. These studs align with the gage-portion 3ᶜ of the clamps, and accordingly bear against the rear edge of the stringer æ during the routing work. The studs 13ª, are employed particularly for properly positioning the shoe 13, when the template is removed from the base and is mounted on the stringer æ for adjusting the guide rails to newly laid out patterns for the tread and riser seats, preliminary to the routing work.

The router in the present case comprises an electrical motor 14, which is adjustable axially in a cylindrical holder 14', the holder being supported and spaced from the base 14ª, by legs 14ᵇ, the latter preferably being insulated and also serving as handles for maneuvering the router. The base 14ª is formed with a plane bottom which rests upon and is movable over the top surface of the stringer æ. The guiding and directing of the cutting tool is effected by a roller 15, which is arranged to traverse the downwardly facing guide-ways in the underside of the template. The roller 15 is pivoted to the top end of a post 15', which is adjustably supported by the free end of a radial arm 16, by means of a set screw 16'. The outer end of the arm 16 is secured to an inverted L-shaped bracket 17, which is detachably supported by the base 14ª (see Fig. 3).

The router base 14ª does not come in contact with the template, and the routing bit A does not enter or traverse either the top or bottom guideways. Only the guide roller 15 carried by the radial guide arm traverse the guide grooves of the template.

The roller 15 is preferably so spaced from the arm 16 that it may be freely moved along the tread and riser guide-ways. By disposing the guiding element beneath the template and leaving the top surface of the stringer æ clear of all obstruction, the routing tool A is able to accurately trace and cut the seats without danger of interference from chips, which in many of the older devices causes considerable annoyance and trouble.

Ordinarily, the pitch of the first tread and riser seats is first marked on the stringer æ, near one end. The template together with the bar 12 and the shoe 13, is then lifted from the base 2 and placed upon the stringer directly over the inscribed pattern, care being taken to bring the studs 13ª into engagement with the rear edge of the stringer, as shown in Figs. 1 and 9. The screw 4ª and the bolts 12ᵇ—12ᵈ are then loosened so as to permit the free maneuvering of the parts relatively to each other, after which the several guide members (5—6—8—9) of the template are adjusted to agree with the said markings. The adjustment of the permanent guide faces of the template to the lines of the pattern may be facilitated by the operator peering through slotted openings 4ᵉ in the web 4ᶠ (see Figs. 1, 2 and 6). When the guide members are properly adjusted, the screw 4ᵈ and the several bolts are tightened up, and the device, as one rigid part, is returned to the base, as shown in Fig. 1. When the pitch of the first seats is marked on the stringer, the operator places a mark at the rear edge of the stringer that corresponds substantially to the center of the screw 4ᵈ, after which he marks the said edge at regular intervals towards the opposite end of the stringer, for indicating the distance between the cuts. The stringer is then disposed upon the template and the ledges 3′, with its rear edge in contact with the guides 3ᶜ and the studs 13ª, as shown in Figs. 1 and 3. A finger gage B, which had previously been adjusted and set on the rod 2ˣ in registry with the center of the screw 4ᵈ, is then swung toward the stringer and the latter is adjusted for bringing the mark opposite the pattern into registry with the finger B, as indicated by the small arrows in Figs. 1 and 2. The stringer may then be clamped in place and the routing started. Thereafter, the succeeding cuts may be accurately effected by simply moving the stringer along towards the left, until the next arrow registers with the finger B. When everything is in readiness, the operator places the router over the front edge portion of the stringer x and enters the roller 15 in the flaring open end of the nearest bottom guide-way of the template. Immediately the roller 15 moves into the guide-way, the bit A begins to cut the tread or riser seat, as the case may be, in the top surface of the stringer. The operator impels the router inwardly manually and at the same time maintains the contact of the roller 15 with the guide surfaces of the template, until the bit A finally completes the cutting of the seats, and is withdrawn at the front edge of the stringer. The router is then removed and the stringer released and moved endwise for the next cutting, and so on. When the routing of the right hand stringer, for example (see Fig. 1), is completed, the operator inverts the template, as described, after which he places a new stringer in position. In the latter case however, instead of drawing the pattern for the first tread and riser seats on the left hand stringer, the operator simply marks its rear edge, for indicating the spacing of the steps, and starts the routing work. It will be understood that when the template is first adjusted to the pitch of the stairs, as explained, this adjustment also serves for cutting the opposite stringer. This will be appreciated, when it is understood that the top and bottom guide-ways being identical, this result being effected by connecting the rails 8 and 9 by the screws 10, the pitch of one set of guide-ways will be the same as the other set. Instead of the routing being done below the bottom of a relatively deep guide-way of the template, as heretofore, the router is mounted directly on the work, while the template is concealed beneath the work. This enables the operator to have a clear view of the progress and execution of the tool, and there is no danger of chips or dust accumulating in the guide-ways, to clog the ways, and prevent the tool from accurately tracing and cutting the patterns.

The novel construction and arrangement of the template proper, and its extremely simple connection with the base 2, whereby the template is supported by gravity and may be readily and quickly detached and inverted for routing right and left hand stringers, when taken with the novel arrangement of the shoe 13, the adjustable bar 12, and the solitary pivot connection 4ᵈ between the template and the bar, by which the template may be adjusted and held for accurately gaging and routing the tread and riser seats, not only quickens the routing work, but enables an operator of ordinary skill to perform perfect and accurate work.

Having thus described my invention, what I claim, is—

1. A tread and riser template for stair stringers provided with similar coinciding angular guide-ways in its opposite sides separated by a web, a base arranged to support a stringer above the gage, a shoe reversibly mounted on the base, and means adjustable on said shoe and pivotally and adjustably supporting the said gage.

2. A template for stair stringers and the like, including a body having coinciding angular guide-ways in its top and bottom sides separated by a web, a base for supporting a stringer above said body in the plane of the uppermost guide-ways, a shoe supported by gravity on said base having portions engaging the bottom face of the stringer, and a member adjustably mounted on the shoe and pivotally supporting the said body near the apexes of the angular guide-ways.

3. A template for stair stringers including a body having similar angular guide-ways in its top and bottom sides, the opposite guide-ways comprising separate patterns respectively for the right and left hand stringers, a base for supporting the stringers, a shoe reversibly mounted on the base having hubs engaging the underside of the stringers, and a member adjustably mounted on the shoe, and pivotally and adjustably supporting the said body at a point near the apexes of the angular guide-ways.

4. A template for stair stringers including a web-like body having similar angular guide-ways in its top and bottom sides separated by said web, a base for supporting the stringers above said body having gage-portions engaging one edge of the stringers and having spaced posts, a shoe supported by said base having hubs that engage said posts, and a slotted member adjustably supported by said shoe and being pivotally connected to said body whereby the body may be adjusted to different angles for varying the pitch of a stair.

5. A tread and riser gage for routing stair stringers provided with similar coinciding angular guide-ways in its opposite sides, means for clamping and holding the stringers against the top face of the gage, means engaging the lowermost guide-ways adapted to direct the routing tool for cutting the tread and riser seats in the top surface of the stringer, a base, and means reversibly mounted on the base and adjustably supporting said gage relatively to the base.

6. In a tread and riser template for routing stair stringers, a flat body having coinciding angular guide-ways in its top and bottom sides, means for clamping and holding the stringers upon the top face of the template, a base supporting one edge of said template by gravity, said template adapted to be inverted for gaging the routing of the opposite stringers of a stair-way, a routing machine adapted to be moved over the top of the stringers, and means carried by said machine adapted to traverse the downwardly facing guide-ways for directing the routing tool for cutting tread and riser seats in the top face of the stringers corresponding exactly to the pitch and dimensions of said lowermost guide-ways.

7. A reversible template for routing the opposite stringers of a stair-way, comprising a flat body having coinciding angular guide patterns in its top and bottom sides, a base provided with means for clamping and holding the stringers above and engaging in the top face of the template, means supported by gravity by said base and adjustably connected to the corresponding portion of the template, said template and its support adapted to be inverted after the routing of a stringer for effecting the routing of the opposite stringer according to the pattern of the lower side of the body, a routing machine adapted to be moved over the top face of a stringer including a radial arm having a guide-roller adapted to traverse the lowermost guide pattern and correspondingly directing the routing tool for tracing and cutting a replica of the said pattern in the top face of the surface.

8. A template for stair stringers comprising a plane web, the opposite faces of said web being formed with similar angular guide-ribs connected at the apexes of the angles by similar circular ribs, said web within said angle being provided with slots, movable guide members arranged in pairs mounted on the top and bottom of said web, each pair of said members being connected by bolts that play in said slots, a base for supporting a stringer above said web in the plane of the uppermost guide ribs, said base having clamps located at its opposite ends and posts disposed between said clamps, a shoe supported by said base and engaging said posts, a bar supported by said shoe, one end of said bar supporting the corresponding portion of said web, means for pivoting the web to said bar, and means for holding said web in various adjusted positions.

9. A tread and riser pattern for stair stringers, comprising a flat body having its top and bottom faces formed with permanent independent angular guide ribs, guide ribs arranged in pairs disposed in angular relation on the opposite faces of the body and movable towards and away from the permanent ribs, means for supporting the edge of said body near the apexes of said angles, means for adjusting said body horizontally on said pivot for varying the pitch of the tread and riser gains, and means for holding the body and related parts rigid during the routing of the gains.

10. A template for guiding a routing bit while cutting tread and riser seats in stair stringers adapted to be disposed beneath the stringers, said template comprising a plate having coinciding guide-ways formed in its top and bottom sides, means for mounting the stringers above said plate, a router adapted to be moved over the top surface of the stringers, a guide-roller disposed beneath said plate adapted to traverse the bottom guide-ways for causing the bit to cut tread and riser seats corresponding to the pitch and shape of said bottom guide-ways, said plate adapted to be inverted for causing the bit to trace and cut tread and riser seats in the opposite stringers of a stair-way, means for adjusting said plate for varying the pitch of a stairway, and means for varying the breadth and angularity of said guide-ways.

11. A template for stair stringers and the like including a body having coinciding angular guide-ways in its top and bottom sides, a base for supporting a stringer above said body, means adapted to traverse the lowermost guide-way for causing a router bit to trace and cut tread and riser seats in the top surface of the stringer corresponding exactly to the pitch and shape of said lowermost guide-way, means carried by the base for adjustably supporting said body, said body and its support adapted to be removed from the base, inverted, and re-applied to the base for gaging the cutting of tread and riser seats in the opposite stringer of a stair-way, a finger gage for indicating the distance between the several tread and riser seats, and means for adjusting and setting said body for varying the pitch of a stair.

12. A gage for guiding a router bit while cutting tread and riser seats in stair stringers, comprising a plate having open angular guide-ways formed in its top and bottom sides, means adapted to traverse the bottom guide-way for directing the bit to trace and cut seats corresponding to the pitch and shape of said bottom guide-way in the top surface of a stringer that is mounted above said plate, said plate adapted to be inverted for gaging and cutting similar seats in the opposite stair stringer, a base adapted for supporting and clamping the stringers during the cutting of the seats, means for gaging and indicating the spacing of the several cuts, and means for adjusting said plate and said guide-ways to draw patterns for stair-ways of different pitch.

13. A template for stair stringers including a web-like body formed with similar angular coinciding guide-ways in its top and bottom sides, the guide-way on one side comprising a pattern for the tread and riser seats of the right hand stringer, the guide-way on the opposite side comprising a pattern for the tread and riser seats of the left hand stringer of a stair-way, means for supporting the stringers above the template, means engaging the guide pattern in the bottom face of the template for causing the routing tool to cut identical seats in the top surface of the stringer, the said template adapted to be inverted and disposed beneath another stringer for enabling the routing tool to cut seats exactly like the pattern in the bottom face of the inverted template.

14. A reversible template for stair stringers, comprising a plate having an angular guide-way in one side comprising the pattern for the tread and riser seats of the right hand stringers, and having a coinciding guide-way in its opposite side comprising a pattern for tread and riser seats of the left hand stringer, means for supporting the stringers to be operated upon above the plane of said plate for enabling a routing machine to be moved over the top face of the stringer, while a member movable with said machine traverses the lowermost guide-ways for causing the said bit to trace and cut tread and riser seats in the top faces of the stringers of the pitch and dimensions of the lowermost patterns.

15. A template for stair stringers having coinciding adjustable angular guide-ways in its top and bottom sides, a base, a shoe supported by gravity on said base, said template and shoe adapted to be removed from the base and placed upon the first pattern of the tread and riser seats drawn upon a stringer for adjusting the template to the pitch and shape of said pattern, the said adjustment adapted to serve for the cutting of tread and riser seats in both the right and left hand stringers, means carried by the shoe and engaging the stringer for aiding the said adjustment, means associated with the base for pivotally supporting the edge of the template nearest the apexes of the angles of the patterns, and means carried by the base for gaging the distance between the adjacent tread and riser seats throughout the length of the stringer.

16. The combination with a stair stringer and a router including a rotatable bit, of a template for guiding the bit, the said template being disposed beneath the stringer and comprising a plate having coinciding guide-ways formed in its top and bottom sides, said bottom guide-ways adapted to be traversed by a guide member that moves with said bit for directing the bit to trace and cut tread and riser seats of the pitch and dimensions of the bottom guide-ways, said template adapted to be inverted for enabling the guide member to traverse the transposed uppermost guide-way for directing the bit to trace and cut seats in the opposite stringer of a stair.

In testimony whereof I affix my signature.

RAY L. CARTER.